Oct. 21, 1930.   F. W. WERNER ET AL   1,779,024
DESULPHURIZATION OF GAS
Filed Sept. 16, 1926
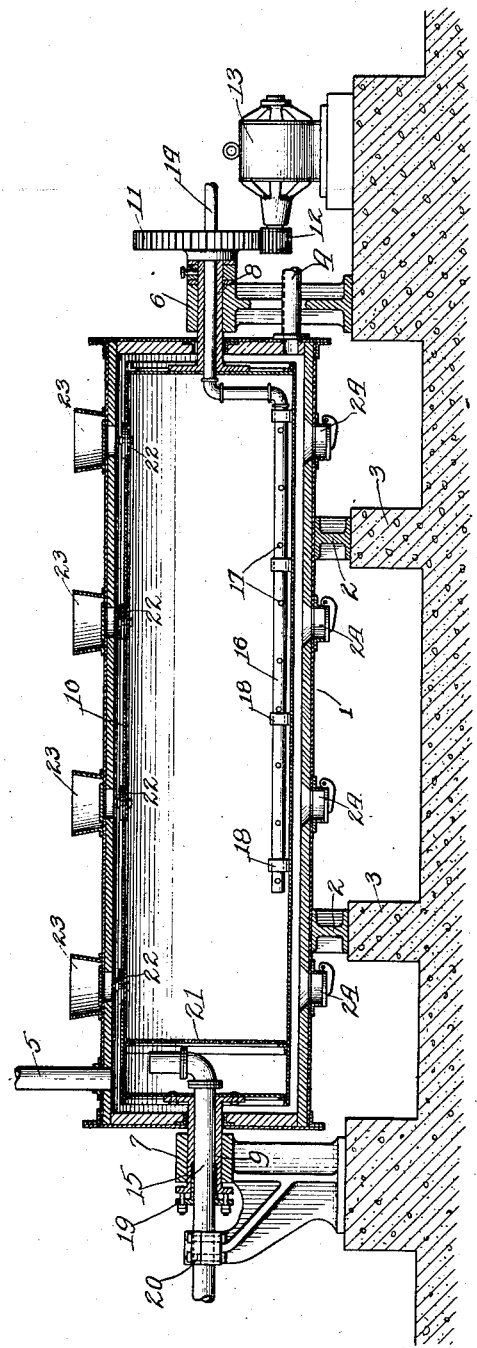
Witness:
R. Burkhardt.
Inventors:
Frederick W. Werner,
Ernest T. Johnston,
By D. Anthony Usina
  atty.

Patented Oct. 21, 1930

1,779,024

UNITED STATES PATENT OFFICE

FREDERICK W. WERNER AND ERNEST T. JOHNSTON, OF JOLIET, ILLINOIS

DESULPHURIZATION OF GAS

Application filed September 16, 1926. Serial No. 135,954.

Our invention relates to an improved process for treating gas and more particularly to a process for desulphurizing gases, such as producer or by-product coke gas and in which a maximum of ammonia is formed as a by-product.

Gases of this general character contain varying amounts of sulphur present mostly as hydrogen sulphide, and also nitrogen, the latter being found particularly in producer gas. In order to partially absorb the sulphur, it has been customary to bring the gas into contact with various substances in the forms of oxides, such as iron, for instance, in a cold condition, which act to break down the hydrogen sulphide to form sulphides of the various metals and to liberate the hydrogen. This and other methods which are now practiced have been successful to a greater or less degree but it has been found desirable to seek other methods in order to effect the removal of a larger percentage of the sulphur present and further, with the aim of developing a process which will result in the formation of a desirable by-product or by-products in larger quantities.

To this end, we propose to provide a novel process employing calcium oxide, consisting in bringing the gas to be treated into contact with the calcium oxide at a desired temperature to remove the sulphur therefrom, the sulphur combining with the calcium to form calcium sulphide with the liberation of free hydrogen from the hydrogen sulphide. An important factor of our process is the reaction temperature which has a direct bearing on the results obtained, and which, in our process, acts to promote the formation of ammonia from the freed hydrogen and the nitrogen present in the gas, the calcium oxide at the particular temperature selected acting as a catalytic agent to promote the formation of ammonia in preference to the formation of any other combinations from the various constituents in the gas.

It is deemed advisable at this point to explain the usual practice in recovering by-products from coke oven gas and to point out the differences between the old process and that practiced in recovering by-products in accordance with the present invention. In accordance with the usual and well-known practice the gas, which is driven off from the coal, when the coal is heated for coke formation, is processed by four individual steps, which are as follows: (1) The tar is removed by well known methods, such as impinging the gas against cool plates; (2) recovering ammonia which is present by passing the gas through a saturator where it is treated with sulphuric acid; and (3) subjecting the gas to an absorption process where it is passed in contact with straw oil for the recovery of certain oils and other volatile matter. During this step of the process carbon bisulphide, benzol, toluol and solvent naphthas Nos. 1 and 2 are removed. As a last step, it is customary to remove sulphur by any of the well known methods and usually by passing it in contact with iron oxide. The sulphur removal in accordance with prior methods has been comparatively incomplete, i. e., only a portion of the sulphur has been removed, and it has been done as a last step in the removal process for the reason that it is impractical to pass the unpurified gas containing the volatile oils through the iron oxide apparatus necessary for removing the sulphur. The sulphur removal is effected primarily because its presence in the gas is undesirable in that unduly large quantities are prohibited by law when used as illuminating or burning gas, and also is undesirable when the gas is burned in an open hearth steel-making process, where the sulphur is apt to enter into the steel composition. By this process, the removal of sulphur at the last stage is open to objection, particularly from the view point that a certain amount of carbon bisulphide is present in the gas which, as above mentioned, is removed by the absorption process with straw oil. Although the various volatile substances taken out by straw oil are separated by a fractional distillation process by which the carbon bisulphide is removed first as the most volatile, it is nevertheless true that traces of sulphur are found in the benzol, toluol and other substances. This necessitates an additional and expensive purifying treatment to produce pure products. It is also to be noted that there is no indication in the former processes that the removal of sulphur makes for the formation of ammonia in that the ammonia having previously been removed the additional amount formed, if any, is so slight that its detection after the sulphur removal is impractical and without commercial value.

In practicing our invention, in which we employ calcium oxide in contact with the gas at a reaction heat of approximately 550° C., we bring the gas in contact with the calcium oxide and consequently remove the sulphur at the second stage, or, in other words, just after the tar has been removed. Subsequently, the ammonia is removed and it is found that the recoverable ammonia is increased a substantial amount, varying between 12 and 20% increase over the normal ammonia recovery. By our process it is possible to pass the gas through the calcium oxide apparatus to remove the sulphur prior to the absorption treatment with straw oil without clogging or impeding the operation. The ammonia recovery is extremely desirable in that the by-product ammonium sulphate is quite valuable. We also make for improvement in that it is possible to effect a substantially 100% removal of sulphur, and consequently all of the carbon bisulphide is eliminated, together with all traces of sulphur in the benzol, toluol and the naphthas. The calcium sulphide which is formed may be sold on open market for about three times the purchase price of the original calcium oxide, and consequently a product is formed which is much more desirable than in the case of the old process as, for instance, iron sulphide, which has no market value.

As a result of a series of tests comparing the reaction obtained with several grades of coal using the same amount of calcium oxide, it has been found that with the exception of tests using very small portions of calcium oxide, the percentages of sulphur removed from the various grades assume a definite ratio toward each other based upon the percent of sulphur in the gas. This information tends to show that at a given temperature, a certain amount of sulphur can be removed with a given amount of calcium oxide, but relative to the temperature to be selected, it has been further found that if a certain predetermined temperature be maintained during the process, a maximum of ammonia is formed as a result. The temperature best suited for the production of a large amount of ammonia has been found to be approximately 550° centigrade or that which will bring the calcium oxide to a dull red glow. Temperature in excess of this, as for instance, 750° centigrade, effects a removal of practically all the sulphur in the gas but at a great sacrifice of ammonia formation.

It is to be understood in connection with this process that the particular source of heat is immaterial, provided the reaction temperature is that which is found necessary to produce the result desired. In some instances the calcium oxide may be heated before it is charged into the rotating drum employed in this process, or it may be heated after it is placed inside the drum, but the preferred method is to heat the gas prior to its introduction into contact with the calcium oxide, so that the constant current of heated gas, heats the calcium oxide and maintains the proper reaction temperature throughout the entire process. Inasmuch as an important feature of this process is the particular reaction temperature selected and not the manner of heating, we do not limit ourselves to any particular manner of heating, but intend to cover in our invention the process herein-described conducted at the reaction temperature stated above. Whatever source of heat may be employed, the calcium oxide is raised in temperature to the particular reaction temperature and at this temperature acts to reduce the sulphur compounds and to serve as a catalyst to promote the ammonia formation.

With this in view, one of the objects of our invention is to provide a process for treating gas which will remove a relatively large part of the sulphur content.

Another object of our invention is to provide a process for desulphurizing gas which contains sulphur in the form of hydrogen sulphide, and nitrogen, consisting in removing the sulphur from the hydrogen sulphide and causing the freed hydrogen and nitrogen to unite to form ammonia.

Another object of our invention is to provide a process of the above described type for treating gas embodying all the advantages in the above stated objects, consisting in bringing the gas in contact with calcium oxide at a dull red reaction for the purpose of removing the sulphur.

Another object of our invention is to select a reaction temperature for the purposes set forth in the preceding stated objects which will effect a maximum removal of sulphur for a maximum formation of ammonia, meaning that the temperature is so selected that the calcium oxide at the selected temperature acts as a catalytic agent to promote the formation of ammonia, the nitrogen being supplied from the gas found therein in a free state and the hydrogen being liberated from the hydrogen sulphide, the latter being broken down in the presence of calcium oxide, it being understood that an increase in temperature would effect the removal of a larger percentage of sulphur but at a sacrifice of the production of ammonia.

A further object of our invention is to provide means for containing a mass of calcium oxide together with means permitting a gas to be treated to pass over in contact with said mass at a particular reaction temperature and for agitating the mass of calcium oxide during said passage of gas.

These and other objects are accomplished by means of the arrangement disclosed on the accompanying sheet of drawings, in which the single figure discloses an agitator of the rotary type for accomplishing our process, the showing being in side elevation partly in cross-section.

The various novel features of the invention will be apparent from the following description and drawing, and will be particularly pointed out in the appended claims.

Referring to the drawing it will be noted that we have disclosed one means for accomplishing our process, the means shown employing a rotary drum mounted in a second heating drum, for heating the calcium oxide and contained gas, but this is not the only means by which our process may be accomplished. As mentioned above, the gas may serve as the heat conducting medium, but inasmuch as it is our intention to cover the reaction at a particular temperature, independently of the manner of heating the device shown will serve to illustrate our invention.

In the figure of the drawing one device for accomplishing our invention is disclosed comprising a brick-lined stationary drum 1 mounted on suitable supports 2 elevated above the level of the floor by the blocks 3 which drum serves as a heating chamber for a rotary drum 10 mounted therein, to be hereinafter more fully described. The heating medium supplied to the interior of the drum is introduced through the inlet 4 which medium may be hot flue gas or any other suitable vapor or gas which passes through the drum leaving at the opposite end through the outlet 5. At the opposite ends of the drum are vertical uprights 6 and 7 which are provided with supporting bearings for mounting in rotatable relation the trunnions 8 and 9 fixed to the ends of the internal drum 10, trunnion 9 having fixed on its outer end a gear wheel 11 in mesh with a second gear wheel 12 fixed to the motor 13 in a manner to cause the motor to rotate the drum 10 positioned inside the heating drum 1. The trunnions 8 and 9 are bored longitudinally in a manner to receive the inlet gas pipe 14 and outlet gas pipe 15 respectively, the inlet pipe being provided with an extension 16 perforated as at 17 so as to distribute the gas throughout the length of the drum, the extension being attached by brackets 18 to the internal surface of the drum in a manner to rotate therewith, the outlet pipe in the form shown in the drawing being stationary. Leakage of the gas around the outlet pipe is prevented by a packing gland 19, the clamping bracket 20 serving to maintain the outlet pipe fixed relative to its port. At the outlet end of the rotating drum 10 a perforated partition 21 is provided serving to prevent the lump or granular calcium oxide from passing into the outlet pipe. In the wall of the rotating drum diametrically opposite the gas inlet pipe extension 16 are manhole openings 22 which are aligned with the chemical charging and discharging manholes 23 and 24 respectively on the upper and lower sides of the stationary drum 1.

In operation, the rotating drum is positioned so that manholes 22 directly underlie the manholes 23 which permits, when these manholes are open, a charging of the rotating drum with lump or granular calcium oxide. Hot flue gas is then turned into the stationary drum through the inlet 4, passing through the heating chamber provided between the two drums on its way to the outlet 5, serving to heat the calcium oxide to the desired temperature which is found to be that which will bring it to a dull red glow. If it is desired, and to expedite the heating process, the calcium oxide may be heated prior to its introduction into the cylinder. When the proper temperature is reached, the gas to be treated is introduced through pipe 14 and the motor 13 is set into operation to rotate the drum 10, the gas passing through the opening 17 through the agitated calcium oxide, where the sulphur present mostly as hydrogen sulphide reacts with the calcium oxide to form calcium sulphide with the liberation of hydrogen, the hydrogen in the presence of the heated calcium oxide as a catalyst uniting with the nitrogen found in the gas to form ammonia, the agitation serving to constantly remove the crust of calcium sulphide formed on the surface of the calcium oxide so as to render the process more efficient. The treated gas together with the ammonia pass to the top of the rotating drum and through the screen 21, leaving the chamber through the outlet pipe 15 where it is further conveyed as desired. The volume of ammonia mixed in the gas, which is of unusually large percentage in our process, may be removed by bringing the gas containing ammonia in contact with sulphuric acid to form ammonium sulphate, but it is to be understood that any of the known methods for separating ammonia from gas of this character may be employed as desired.

It is to be further understood that the outlet pipe 15 may be fixed to rotate with the drum 10 if it is so desired, it being found in some instances, especially when the rotating drum is not completely charged to its capacity with calcium oxide, that due to the air space between the top of the calcium oxide and the drum, the gas passes directly from the inlet pipe extension 16 to the outlet pipe when the drum is in such a position that the inlet pipe is at the top. This, however, can be readily avoided by placing the mouth of the outlet pipe diametrically opposite that of the inlet pipe and causing the same to rotate with the drum, in which case the gas will be forced to pass through the calcium oxide in its path through the apparatus.

When it is desired to discharge the spent chemicals, the drum is rotated to an extent to align the manholes 22 with the passage of the manholes 24, found at the base of the stationary drum, and the contents are emptied therethrough, the drum then being rotated through the arc of 180° to bring the manholes 22 in a top position in alignment with manholes 23 for recharging.

We claim:

1. In the herein described process of treating gas containing sulphur in the form of hydrogen sulphide, and nitrogen, the step which consists in forming calcium sulphide and synthesizing ammonia by bringing the gas into contact with calcium oxide at a dull red reaction temperature.

2. In the herein described process of treating gas containing sulphur in the form of hydrogen sulphide, and nitrogen, the step which consists in forming calcium sulphide and synthesizing ammonia by bringing the gas into contact with calcium oxide at a reaction temperature of substantially 550° C.

3. In the herein described process of treating gas containing sulphur in the form of hydrogen sulphide, and nitrogen, the step which consists in forming calcium sulphide and synthesizing ammonia by bringing the gas into contact with an agitated volume of calcium oxide at a dull red reaction temperature.

4. In the herein described process of treating gas containing sulphur in the form of hydrogen sulphide, and nitrogen, the step which consists in removing sulphur and synthesizing ammonia by bringing the gas into contact with calcium oxide at a dull red reaction temperature.

5. In the herein described process of treating gas containing sulphur in the form of hydrogen sulphide, and nitrogen, the step which consists in removing sulphur and synthesizing ammonia by bringing the gas into contact with calcium oxide at a reaction temperature of substantially 550° C.

6. In the process of removing sulphur from gas containing sulphur in the form of hydrogen sulphide, and nitrogen, the step of synthesizing ammonia, consisting in employing calcium oxide at a dull red reaction temperature for reaction to form calcium sulphide.

7. In the process of removing sulphur from gas containing sulphur in the form of hydrogen sulphide, and nitrogen, the step of synthesizing ammonia, consisting in employing calcium oxide at a dull red reaction temperature for reaction to form calcium sulphide, with the liberation of nascent hydrogen and as a catalyst to promote the formation of ammonia.

8. The process of treating gas containing sulphur in the form of hydrogen sulphide, and ammonia, which consists in removing the sulphur and simultaneously synthesizing ammonia by passing the gas in contact with calcium oxide at a reaction temperature of substantially 550° C.

Signed at Joliet, Illinois, this 9th day of September, 1926.

FREDERICK W. WERNER.
ERNEST T. JOHNSTON.